United States Patent
Willess et al.

(10) Patent No.: US 7,600,006 B2
(45) Date of Patent: Oct. 6, 2009

(54) PEER-TO-PEER DISTRIBUTION OF FIRMWARE

(75) Inventors: Brian Willess, Tempe, AZ (US); Mervyn Wongso, Gilbert, AZ (US)

(73) Assignee: Inter-Tel, Inc, Tempe, AZ (US)

( * ) Notice: Subject to any disclaimer, the term of this patent is extended or adjusted under 35 U.S.C. 154(b) by 847 days.

(21) Appl. No.: 10/931,487

(22) Filed: Aug. 31, 2004

(65) Prior Publication Data

US 2006/0048144 A1    Mar. 2, 2006

(51) Int. Cl.
*G06F 15/177* (2006.01)
(52) U.S. Cl. .................. 709/222; 709/221; 709/228; 709/248; 709/249; 717/171; 717/176
(58) Field of Classification Search ............... 709/205, 709/218, 220, 248, 204, 221, 222, 228, 249; 717/171, 176
See application file for complete search history.

(56) References Cited

U.S. PATENT DOCUMENTS

| | | | |
|---|---|---|---|
| 5,793,982 A * | 8/1998 | Shrader et al. ............... 709/232 |
| 5,805,897 A | 9/1998 | Glowny | |
| 5,974,454 A * | 10/1999 | Apfel et al. .................. 709/221 |
| 6,094,679 A * | 7/2000 | Teng et al. ................... 709/220 |
| 6,199,204 B1 | 3/2001 | Donohue | |
| 6,321,258 B1 * | 11/2001 | Stollfus et al. ............... 709/220 |
| 6,381,742 B2 * | 4/2002 | Forbes et al. ................. 717/176 |
| 6,418,555 B2 | 7/2002 | Mohammed | |
| 6,477,583 B1 * | 11/2002 | Zayas et al. .................. 709/248 |
| 6,487,583 B1 * | 11/2002 | Harvey et al. ................ 709/204 |
| 6,560,643 B1 * | 5/2003 | Shepherd et al. ............. 709/220 |
| 6,640,241 B1 * | 10/2003 | Ozzie et al. .................. 709/204 |
| 6,665,384 B2 | 12/2003 | Daum et al. | |
| 6,725,260 B1 * | 4/2004 | Philyaw ....................... 709/220 |
| 6,725,261 B1 * | 4/2004 | Novaes et al. ................ 709/220 |
| 6,792,466 B1 * | 9/2004 | Saulpaugh et al. ........... 709/229 |
| 6,892,230 B1 * | 5/2005 | Gu et al. ....................... 709/220 |
| 6,898,642 B2 * | 5/2005 | Chafle et al. ................. 709/248 |
| 6,966,060 B1 * | 11/2005 | Young et al. ................. 717/177 |
| 2002/0091807 A1 | 7/2002 | Goodman | |
| 2002/0165976 A1 * | 11/2002 | Gonthier et al. ............. 709/237 |
| 2003/0105812 A1 * | 6/2003 | Flowers et al. .............. 709/203 |
| 2004/0006586 A1 | 1/2004 | Melchione et al. | |

FOREIGN PATENT DOCUMENTS

WO    WO 02/29551 A2    4/2002

* cited by examiner

*Primary Examiner*—Michael Won
(74) *Attorney, Agent, or Firm*—Michelle Whittington, Esq.

(57) ABSTRACT

A firmware distribution system is disclosed with particular application to integrating a plurality of ancillary endpoints into an existing network of endpoints. The ancillary endpoints being coupled to an isolated network and a master device downloading the desired firmware to the ancillary endpoints in a peer-to-peer distribution. An administrator may be coupled to the isolated network for providing a management and control mechanism for an installer. Once the ancillary network has the firmware loaded, the network may be tested prior to integration with the existing network of endpoints. Upon verification of the download and operation of the ancillary endpoints, the ancillary endpoints can be readily integrated with the existing network without major disruption to the existing network.

19 Claims, 3 Drawing Sheets

PEER-TO-PEER DISTRIBUTION OF FIRMWARE

FIELD OF INVENTION

The present invention relates generally to peer-to-peer distribution of firmware and, specifically, to a peer-to-peer system and method for distributing software to endpoints.

BACKGROUND OF THE INVENTION

Firmware is software that is kept in a semi permanent memory, such as PROM (programmable read only memory) or EPROM (electrical PROM). The software is so constantly called upon by the computing device that it is burned into a chip and is not forgotten when the power is shut off to the device. Because it is semi permanent, firmware can be altered or replaced by, for example, erasing the PROM or EPROM.

In the communications industry, high tech IP (Internet Protocol) telephony devices continue to replace the traditional analog keysets. This is due largely, in part, because of the desire for a single network for all communications devices and services. These LAN-based communication devices can be connected to the company's Ethernet in generally the same manner as a desktop personal computer. The communication devices or endpoints tap into the company's network and in some instances, the more advanced "smart-phones" can actually replace several of the functions of a traditional desktop computer, such as providing internet access and email. Given the advancement in endpoint technology, it is not surprising that prior to shipping the device to an end user, firmware is nearly always installed on these devices.

Traditionally, when an installer initially brings a network of endpoints online (i.e., connects the network of endpoints to the company's Ethernet, voice mail systems, PBX, and other communications systems), the endpoints are powered up and initialized one-by-one until all the units are running. The installer may perform standard diagnostics on the newly installed network to verify the endpoints are satisfactorily integrated with the network. As the company requires additional endpoints to be added to the network, the installer powers up and initializes each new endpoint to the existing network one-by-one until all the added units are integrated. However, during an endpoint upgrade or addition it may be that some or all of the newly installed endpoints have firmware that varies from the existing endpoints on the network. The installer is now faced with the challenge of determining which firmware version to operate the system in, and more importantly, how to override and swiftly install the desired firmware to some of the endpoints.

In most cases, the entire network is brought offline so that all the endpoints can be forced to upgrade to the same firmware. Of course this option requires the company to be without network service for the period of time it takes the installer to ensure all the endpoints are on the same firmware version and operating properly. Alternatively, the installer may choose to keep the network online while attempting to convert the selected endpoint's firmware, however this approach is risky due to inevitable disruptions to the network. Another problem for the installer is where to obtain the desired version of firmware. Often times the firmware is stored in a secure database at the end user's site and can be copied from a master server to the endpoints. Alternatively, in a peer-to-peer network, one of the endpoints may be designated as a master to keep a separate copy of the firmware stored for sharing purposes. In these instances, the master endpoint often requires specific software to manage the distribution of software or firmware to other endpoints. Storing software or firmware for these purposes is often inconvenient due to the high level of maintenance required, such as storing all the various versions of the firmware, continually backing up the data in the event of system failures, securing the data, and of course maintaining precise documentation of exactly where the data is stored, i.e., which server, endpoint, etc.

Thus, there exists a need in which modifications of a communication network, such as expansion of endpoints, is accomplished without major disruption to the existing network. It is also desirable to verify the integrity of the modified system without having to disrupt the existing system. In addition, it is preferable to avoid the problems accompanying storing of firmware for sharing purposes.

SUMMARY OF THE INVENTION

A software distribution system for a communications network includes an existing network of endpoints, each having software stored thereon that is compatible with the other endpoints on the network. A local area network provides a communication pathway for the existing network of endpoints. An ancillary network of endpoints is in a peer-to-peer configuration with one of the ancillary endpoints being a distributor endpoint and having a target software stored thereon. The target software is compatible with the software on the existing endpoints. A master device provides the ancillary endpoints with an IP address. An isolated network provides a communication pathway for the ancillary network of endpoints, and an administrator is coupled to the isolated network for providing commands to the ancillary endpoints and the master device. The administrator commands the distributor endpoint to distribute the target software to the ancillary endpoints and commands the ancillary endpoints to send a status report to the master device. Upon distribution of the target software, the ancillary network of endpoints communication pathway is severed and the ancillary endpoints are coupled to the local area network.

In one embodiment, the master device is one of the ancillary endpoints. In another embodiment, the master device is one of the existing endpoints.

In yet another embodiment, the master device is designated by user intervention. In one particular embodiment, the user intervention is by activating one or more keys on the endpoint.

A method of integrating a plurality of ancillary endpoints into an existing network of endpoints includes coupling the ancillary endpoints in an isolated peer-to-peer network, and coupling an administrator to the isolated network. A master endpoint is designated and assigned a master IP address. The master endpoint has a target software stored thereon. Each of ancillary endpoints are assigned an IP address. The master endpoint downloads the target software to the ancillary endpoints via the isolated peer-to-peer network. The distribution of the target software to the ancillary endpoints may be verified. The ancillary endpoints are severed from the isolated network and coupled to the existing network of endpoints.

In one embodiment of the method, the verification includes viewing a web page corresponding to the master IP address. In another embodiment, the verification includes the ancillary endpoints sending a status report to the master IP address.

In yet another embodiment, the method includes accessing a web page from the administrator that corresponds to the master IP address and viewing the page reports from each of the ancillary endpoints.

A method for adding at least two ancillary endpoints to a network of existing endpoints includes coupling the ancillary endpoints to an isolated hub and coupling a computing device to the isolated hub. The computing device capable of accessing a web page and displaying the contents of the page. A programming session may be initiated by accessing the web page and one or more of the ancillary endpoints may be selected via the web page. A master endpoint is designated as the distributor endpoint on the basis that the firmware stored on the master is to be distributed to the selected ancillary endpoints via the isolated hub. The distribution of the firmware to the selected ancillary endpoints is confirmed and the computing device is coupled to the network of existing endpoints. The integration of the ancillary endpoints to the network of existing endpoints may be tested. The programming session is terminated and the ancillary endpoints are coupled to the network of existing endpoints.

In one embodiment the computing device is a portable computer. In another embodiment the master endpoint and the computing device are a single multi-functional endpoint.

BRIEF DESCRIPTION OF THE DRAWINGS

These and other features, aspects, and advantages may be best understood by reference to the following description taken in conjunction with the accompanying drawings, wherein like reference numerals indicate similar elements.

DETAILED DESCRIPTION

Figure 1:
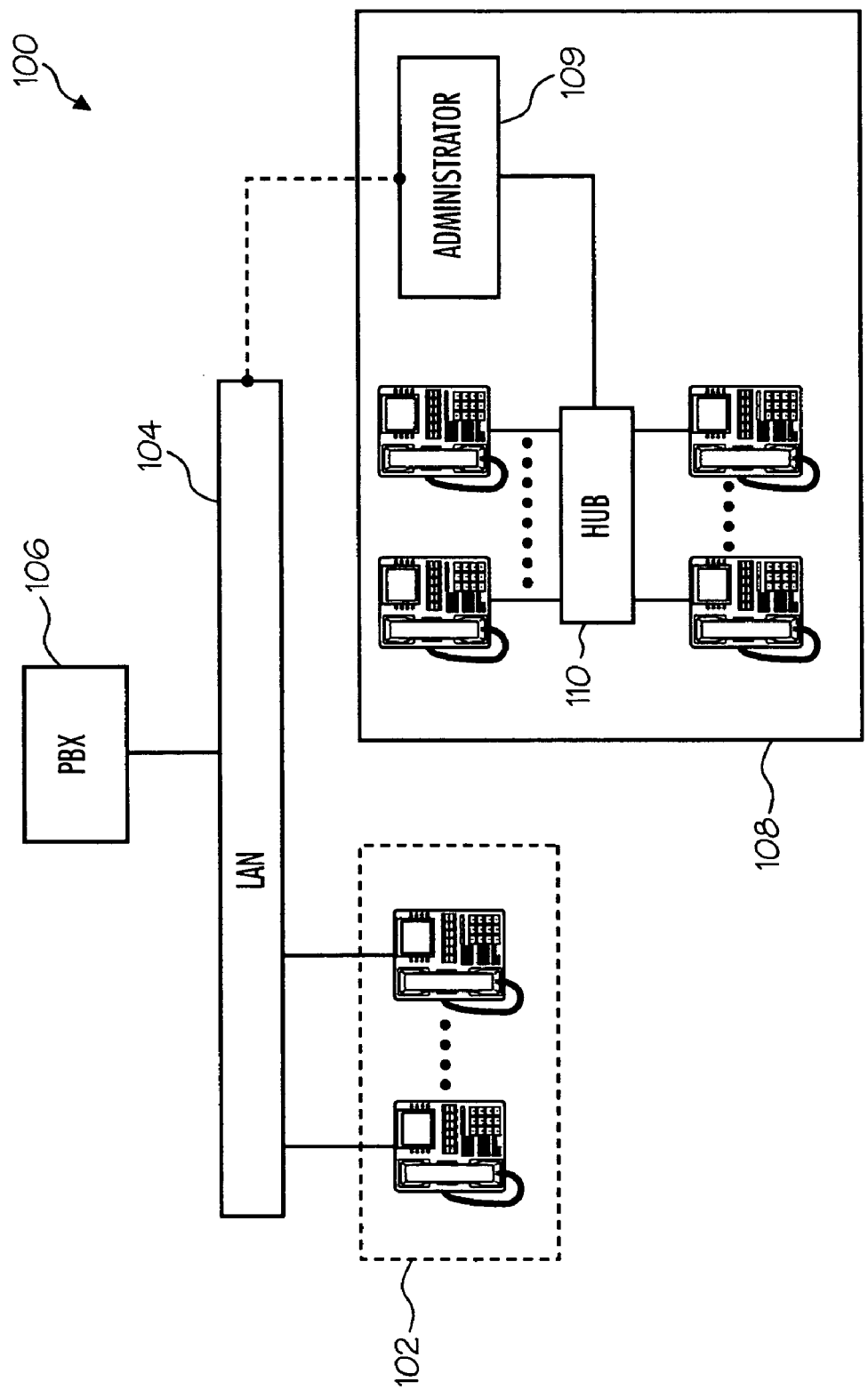
FIG. 1 illustrates an exemplary network in accordance with the various embodiments.

FIG. 1 illustrates an exemplary network 100 which may support a peer-to-peer distribution of firmware in accordance with the various embodiments. Exemplary network or system 100 generally includes an existing network of endpoints 102, an ancillary network of endpoints 108, a PBX or switching system 106, and a local area network (LAN) 104.

Used herein, "endpoints" may include telephones (stationary and portable), keysets, personal computers, computing devices, personal digital assistants, pagers, wireless remote clients, messaging devices, and any other communication device capable of transmitting and receiving communication signals. Endpoints typically include any communication device capable of coupling to a LAN. In particular embodiments, some or all of the endpoints may include a processor, memory, network interface, user I/O and power conversion, as needed, to establish the device as an operational unit or other real-time communicating device connected to a packet network.

PBX system 106, or the equivalent, may include, but not limited to, PBX systems, software controlled switches and hybrid telephone systems. PBX systems generally provide telephone and messaging services as needed to multiple office users and their endpoints (such as network of endpoints 102). Provided services typically focus on the delivery of external and internal communications to the network. In general, PBXs are office-based telephone exchanges having special functions directed towards the communication needs of business users. Similarly, the PBX is any customer-owned switching apparatus that is used to connect real-time voice or multimedia communications from user-to-user (or endpoint-to-endpoint) regardless of the technology employed, such as time division multiplexing, packet switching, optical switching, pulse code modulation, internet protocols, ATM, or any combination thereof. Modern PBXs also provide integrated voice mail, hands free intercom calls, call center functions, complex system networks, and additional features using external computer control.

LAN 104 may be Ethernet, wired and wireless solutions, or any other communication medium suitable for routing data, information, video and/or voice among a network of endpoints, e.g., network 102 and PBX 106. Of course, it should be appreciated that LAN 104, or the equivalent, may be used for routing various other data, and the like, within the network and may facilitate communication among other components not shown on FIG. 1.

The existing network of endpoints 102 includes any number of endpoints configured in a conventional manner and coupled to LAN 104. Network 102 is "existing" in the sense that the endpoints within the network are operable (or at least capable of being operable) and typically include a common version of firmware.

Ancillary network of endpoints 108 includes two or more endpoints to be added to existing network of endpoints 102. Ancillary network 108 generally includes a hub 110 and an administrator 109. Hub 110 provides an isolated LAN, or equivalent medium, in which the ancillary endpoints may be coupled in a peer-to-peer manner. Hub 110 further provides communication between administrator 109 and the ancillary endpoints. Administrator 109 includes any computing device capable of bi-directional communication with the ancillary endpoints. Additionally, administrator 109 may be coupled to LAN 104.

The isolated LAN network of 108 (hub 110) may be considered a dedicated network used to construct a temporary peer-to-peer connection arrangement for distribution of firmware. Each coupled endpoint ("peer") is capable of sending and receiving messages to the other endpoints. As is common in Ethernet LAN, data packet transmission and protocols functionally are bus-topologies employing wire management devices connected in a star topology behaving as a bus. Thus, each port can "hear" the data activity present on the other ports. However, switches (switching hubs) may be used to block this data, behaving functionally as a star network except when broadcasts are needed. Network 108 provides a controlled environment for the endpoints, and network, that are being updated, configured and tested prior to integrating the ancillary network with the main network. Additional features of network 108 will be discussed in detail below.

The following flowcharts are provided to better understand the various steps of operation in a peer-to-peer distribution system as described herein. It should be realized that the following description is not intended to be limiting but rather to provide a description of various embodiments and a best mode of operation. It should be appreciated that additional steps may occur that are not represented on the following flowcharts but are discussed in the conjoining text or elsewhere herein. Moreover, there may be operations, functions, routines, and the like that are not depicted on the flows or elsewhere but are well understood in the industry as common actions for a communications system. Unless specifically stated, the order of the depicted and described operations is not limited to the description.

Figure 2:
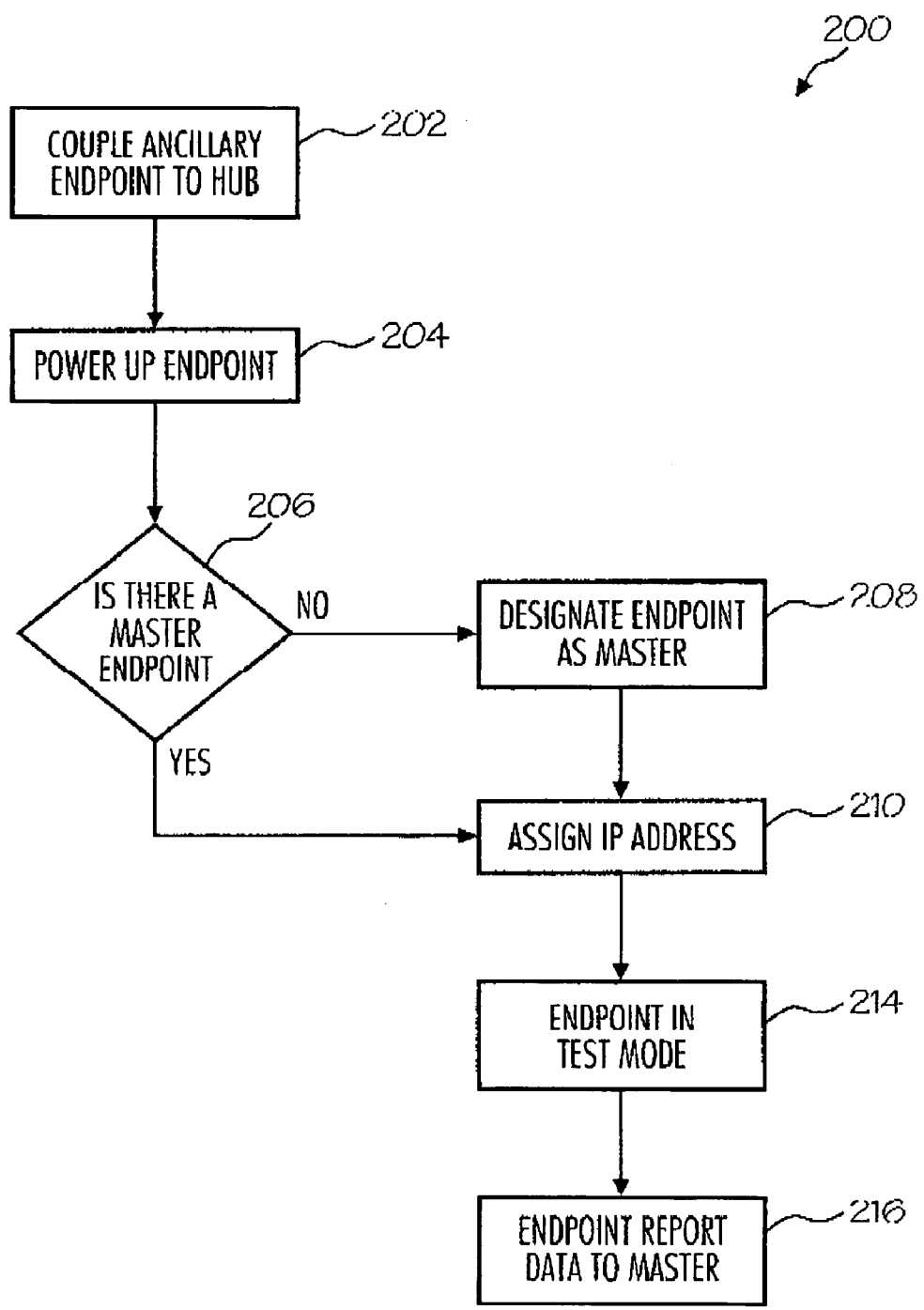
FIGS. 2 and 3 are flowcharts of exemplary operations of a peer-peer distribution system.

FIG. 2 is a flowchart 200 of exemplary operations in a peer-to-peer distribution system and, more particularly, exemplary operations during power-up of the ancillary endpoints. Initially, each of the ancillary endpoints are coupled to an isolated network, such as hub 110 (step 202). Each endpoint is powered up via the connection to hub 110 (step 204). In conventional networked systems, an Ethernet hub, such as hub 110, does not normally deliver power to the coupled devices. Thus, ancillary network 108 differs in that each endpoint is powered up from the hub connection. In one particular embodiment, the endpoints are powered up and booted almost immediately upon connection to the hub. Alternatively, each endpoint may be independently powered and booted up when power is supplied to the endpoint. However, in the event that the hub itself is not powered up when the endpoints are coupled, then the endpoints do not power up until the hub is actually activated.

Each endpoint uses the Internet Protocol (IP) and connects to the hub. As part of the power up-boot up sequence, the endpoint looks for an IP address from a server-type device. There may be various methods, techniques and protocols that are known or will be known that are suitable for this application. One such protocol is DHCP (Dynamic Host Configuration Protocol) which is a TCP/IP protocol that enables devices to get temporary or permanent IP addresses from centrally-administered servers, typically out of a pool of IP addresses. In general, DHCP allows a device to dynamically assign IP addresses on the fly. Pursuant to one particular embodiment, the server-type device is any one of the ancillary endpoints. Thus, it must be determined if there is already a master endpoint (step 206). If there is not a master endpoint, for example, this is the first ancillary endpoint to be coupled to the hub, then the endpoint will be unable to locate a server to receive an IP address. In this case, the endpoint will be designated as the master (step 208). It may be the case that one of the existing network endpoints is designated as the master. This may be useful if the software loaded on an existing endpoint is the desired software to distribute. In this situation, the existing endpoint may be temporarily disconnected from the existing network and temporarily coupled to the ancillary network (i.e., hub 110).

In one embodiment, the endpoint is designated as the master by installer intervention. This may be accomplished by various acts. One such action includes the installer activating one or more keys on an endpoint. For example, depressing and holding one or more of the endpoint keys prior to power up, or soft keys. This action directs the endpoint to become the master and support the other endpoints that come on line as a peer within the isolated network. Once the master designation is made, the master endpoint assigns itself an IP address (step 210). The master IP address may be a fixed IP address that is known and can be readily called upon. In the above example, the installer releases the key(s) when the endpoint powers up. It may be desirable for the master endpoint to confirm its IP address setting and verify a successful boot up by, for example, displaying the information on a suitable endpoint or associated display.

As subsequent endpoints are brought on line, they too look for a server-type device. The master endpoint behaves as the server and assigns an IP address to each of the ancillary endpoints in the network by, for example, using DHCP (step 210). Once IP addresses are assigned to the endpoints, they begin to transmit and receive UDP as commonly used by the TCP/IP protocol to process communications on a peer-to-peer basis. The information sent to the endpoints from the master may include a command to operate in a "test mode" (step 214). This mode is useful to monitor, alter and preview each endpoint's operation, as well as the ancillary network, prior to bringing the network in communication with the existing network, e.g., network 102. Each of the ancillary endpoints reports information to the master, which includes, for example, firmware versions, configurations and licensing data (step 216).

Figure 3:
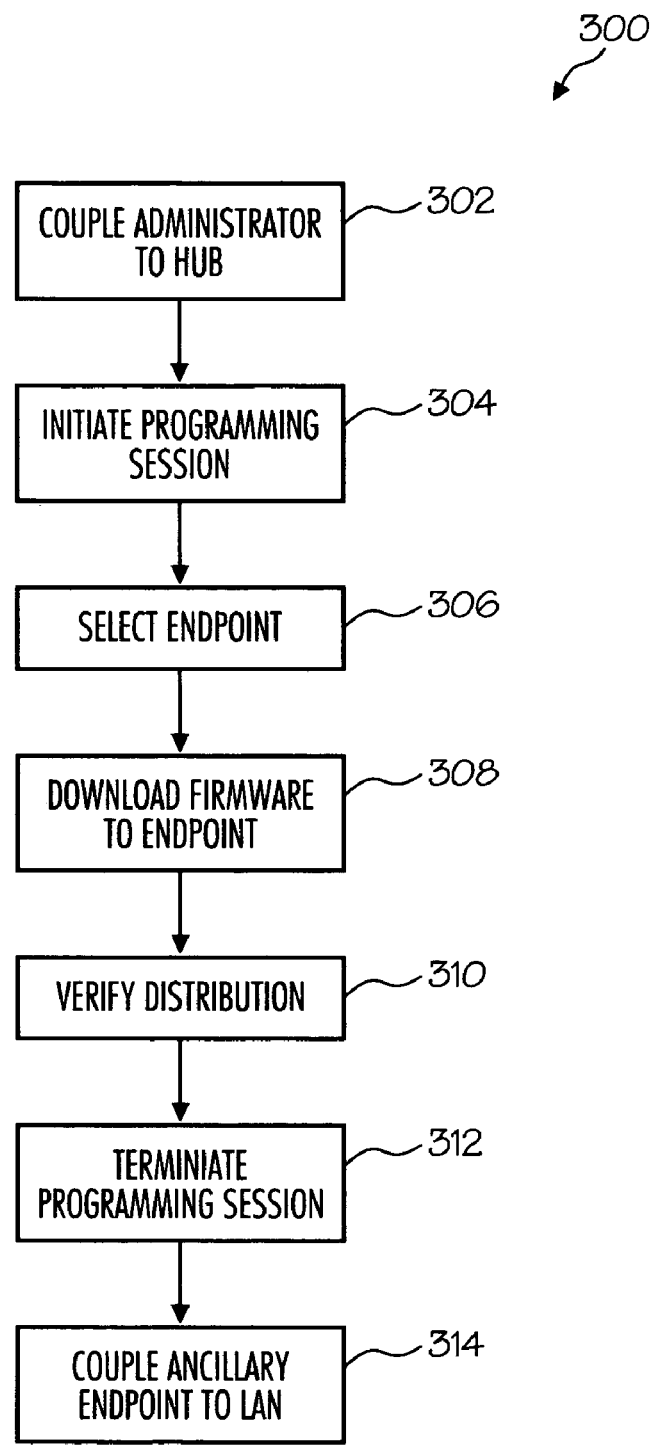

FIG. 3 is a flowchart 300 of exemplary operations in a peer-to-peer distribution system and, more particularly, exemplary operations of an administrator, e.g., administrator 109. The administrator is initially coupled to the isolated network, such as hub 110 (step 302). As previously stated, administrator 109 may include any computing device capable of bi-directional communication with the ancillary endpoints. In one particular embodiment, administrator 109 includes a portable computing device having web browsing capabilities, such as a laptop computer. In another embodiment, administrator 109 includes a multi-functional IP telephone, such as the Model 8690 sold by Inter-Tel, Inc., having a graphical display and function keys to control the distribution process. Additionally, it should be realized that administrator 109 may be one of the ancillary endpoints used in a management manner prior to going live on existing network 102.

It is often useful for an installer to have a certain level of control over the distribution process. Depending upon the particular application, the installer may have a greater level of control in some networks than in others. Typically, the installer utilizes the administrator for the distribution process. In this manner, the installer initiates a programming session for the purposes of managing the software distribution (step 304). In one embodiment, the programming session involves accessing a web page via the browser from the administrator. The web page may be a pre-defined URL, such as the master IP address. As previously mentioned, the ancillary endpoints report information to the master and, in one specific embodiment, the reports are received at the master IP address and update a corresponding web page. For purposes of this embodiment, the installer is able to view the reported information for each of the subsequent endpoints. The installer then determines which endpoint to copy data from to the other ancillary endpoints and a selection of endpoints is made (step 306). For example, one endpoint may be selected as the first distributor because it contains the desired version of firmware. Then the installer is given the opportunity to select one or more of the ancillary endpoints which will receive a copy of the desired firmware from the distributor endpoint (step 306). Using this technique, the installer may elect to leave certain endpoints out of the distributor process for a variety of reasons, such as physical restrictions and incompatibilities.

The distributor endpoint then initiates a download of its firmware to the selected endpoints (step 308). For example, a TFTP process may be used to copy the information between the endpoints. The received firmware is loaded to the memory of the endpoints. Additionally, each of the endpoints may undergo a reboot process. Upon completion of the distribution, a verification of the process may occur (step 310). Each of the endpoints may send an updated report to the master indicating its current configurations. The report may be part of a "self-test" for each endpoint and may be initiated by the master (e.g., directing the endpoint to be in test mode (step 214)) or may be integrated with the download process. The test mode may allow the installer to send "ping" commands to the endpoint under test to monitor the endpoint's response. In one particular embodiment, a confirmation may be displayed to the installer on, for example, a display of the administrator. In this embodiment, the installer can view the reported information for each selected endpoint and verify that the intended distribution occurred. In another embodiment, the installer can verify the distribution, as well as check on the configurations of any of the endpoints by visiting a web page of the endpoint using the IP address of the particular endpoint. Various other techniques of confirmation may be used as well, such as visual and audible board lamps, displays and speakers.

Once all of the selected endpoints are updated, tested and otherwise made ready to integrate with the existing network, e.g., network 102, the installer can terminate the programming session (step 312). Alternatively, the installer may choose to couple each of the endpoints to existing network via LAN 104 (step 314) and continue to monitor the endpoints as they connect to the main system. In one embodiment, the installer can observe the registration process of the endpoints by adding a second NIC (Network Interface Card) to administrator 109 and coupling this card to the existing main network. In this manner, packets going to and from the ancillary endpoints between the existing network and the isolated network can be monitored. This configuration routes the endpoint's DHCP request, for example during the subsequent boot up process to the main network, to the main network's DHCP server. Because the administrator has been coupled between the main network and the isolated network, all data packets between the endpoints and the main network go through the administrator. If there are any problems with the endpoints registration with the main network they can be readily identified. Upon successful completion of the registration process with the main network, communication with the administrator may be severed and the ancillary network of endpoints is fully integrated with the existing network of endpoints. Moreover, all of the endpoints are operating with compatible firmware or software, the existing network was not disrupted during the integration, and the installer was able to verify the integrity of the modified system (ancillary plus existing) without the risk of major network failures.

The environment needed to support the peer-to-peer distribution system and, more particularly, the ancillary network of endpoints, is extremely unrestrictive. In fact, an installer may be able to couple the ancillary endpoints to an isolated LAN and perform all the necessary control functions directly from the installer's van prior to entering the customer's facility. In this manner, the ancillary endpoints are ready to be integrated to the customers' existing network the moment they are coupled to the customer's LAN.

Presented herein are various systems, methods and techniques for peer-to-peer distribution of firmware, including the best mode. Having read this disclosure, one skilled in the industry may contemplate other similar techniques, modifications of structure, arrangements, proportions, elements, materials, and components that fall within the scope of the present invention. For example, in one embodiment, the newly booted endpoints may send UDP status packets to the administrator rather than the master. This may be useful if the installer does not have access to a web page to review the status information. In other applications, the peer-to-peer distribution system may be used to take one or more existing networked endpoints off line, couple the endpoint to an isolated LAN, update the firmware or software, and then test the endpoint before bringing back into service. These and other changes or modifications are intended to be included within the scope of the disclosure, as expressed in the following claims.

The invention claimed is:

1. Software distribution system for a communications network comprising:
    an existing network of endpoints wherein each of the existing endpoints includes a software stored thereon that is compatible with the other endpoints on the network;
    a local area network providing a communication pathway for the existing network of endpoints; and
    an ancillary network of endpoints comprising,
        two or more ancillary endpoints in a peer-to-peer configuration, one of the ancillary endpoints being a distributor endpoint and having a target software stored thereon that is compatible with the software on the existing endpoints,
        a master device in bi-directional communication with the ancillary endpoints and providing the ancillary endpoints with an IP address,
        an isolated network providing a communication pathway for the ancillary network of endpoints,
        an administrator coupled to the isolated network and providing a plurality of control commands to the ancillary endpoints and the master device, the administrator commanding the distributor endpoint to distribute the target software to the ancillary endpoints and commanding the ancillary endpoints to send a status report to the master device,
        whereby, upon distribution of the target software, the ancillary network of endpoints communication pathway is severed and the ancillary endpoints are coupled to the local area network.

2. The system of claim 1, wherein the master device comprises one of the ancillary endpoints.

3. The system of claim 1, wherein the master device is designated by a user intervention.

4. The system of claim 3, wherein the user intervention comprises activating one or more keys on an endpoint.

5. The system of claim 1, wherein the master device comprises one of the existing endpoints.

6. The system of claim 1, wherein the ancillary network of endpoints operate in a test mode prior to being coupled to the local area network.

7. A method of integrating a plurality of ancillary endpoints into an existing network of endpoints, each of the existing endpoints includes a software stored thereon that is compatible with the other endpoints on the network, a local area network providing a communication pathway for the existing network of endpoints, the method comprising:
    coupling the ancillary endpoints in an isolated peer-to-peer network;
    couple an administrator to the isolated network, the administrator providing a plurality of control commands to the ancillary endpoints and a master endpoint;
    designate the master endpoint and assign a master IP address to the master endpoint, the master endpoint having a target software stored thereon;
    assign an IP address to each ancillary endpoint;
    commanding, from the administrator, the master endpoint to distribute the target software to the ancillary endpoints;
    download the target software from the master endpoint to the ancillary endpoints via the isolated peer-to-peer network;
    verify the distribution of the target software to the ancillary endpoints;
    upon verification, sever the ancillary endpoints from the isolated network; and
    couple the ancillary endpoints to the existing network of endpoints via the local area network.

8. The method of claim 7, wherein designating a master endpoint comprises a key selection on the endpoint.

9. The method of claim 7, wherein the master endpoint comprises one of the existing network endpoints.

10. The method of claim 7, wherein the master endpoint assigns the IP addresses to each of the ancillary endpoints.

11. The method of claim 7, wherein verification comprises viewing a web page corresponding to the master IP address.

12. The method of claim 7, wherein verification comprises the ancillary endpoints sending a status report to the master IP address.

13. The method of claim 7 further comprising accessing a web page from the administrator corresponding to the master IP address and viewing the web page having reports from each of the ancillary endpoints.

14. A method for adding at least two ancillary endpoints to a network of existing endpoints, each of the existing endpoints includes a software stored thereon that is compatible with the other endpoints on the network, a local area network providing a communication pathway for the existing network of endpoints, the method comprising:

coupling the ancillary endpoints to an isolated hub;

coupling a computing device to the isolated hub, the computing device capable of accessing a web page and displaying the contents of the page and for providing a plurality of control commands to the ancillary endpoints and a master endpoint;

initiating a programming session by accessing the web page;

selecting one or more ancillary endpoints via the web page;

designating the master endpoint as the distributor endpoint on the basis that the firmware stored on the master is to be distributed to the selected ancillary endpoints via the isolated hub;

commanding the master endpoint to distribute the firmware to the ancillary endpoints;

confirming the distribution of the firmware to the selected ancillary endpoints;

upon confirmation, coupling the computing device to the network of existing endpoints;

testing the integration of the ancillary endpoints to the network of existing endpoints;

terminating the programming session; and upon successful testing, coupling the ancillary endpoints to the network of existing endpoints via the local area network.

15. The method of claim 14, wherein the computing device comprises a portable computer.

16. The method of claim 14, wherein testing comprising the master endpoint commanding the endpoints to operate in a test mode.

17. The method of claim 14, further comprising reporting a status of each ancillary endpoint to the master endpoint.

18. The method of claim 17, wherein reporting comprises transmitting data to an IP address of the master endpoint.

19. The method of claim 14, wherein the master endpoint and the computing device are a single multi-functional IP endpoint.

\* \* \* \* \*